US012793546B2

(12) United States Patent
De Vallois

(10) Patent No.: US 12,793,546 B2
(45) Date of Patent: Nov. 10, 2026

(54) METHOD AND SYSTEM FOR THE REMOTE SUPERVISION OF A FLEET OF SELF-DRIVING VEHICLES

(71) Applicant: NAVYA MOBILITY, Villeurbanne (FR)

(72) Inventor: Thierry De Vallois, Paris (FR)

(73) Assignee: NAVYA MOBILITY, Villeurbanne (FR)

( * ) Notice: Subject to any disclaimer, the term of this patent is extended or adjusted under 35 U.S.C. 154(b) by 18 days.

(21) Appl. No.: 18/847,402

(22) PCT Filed: Mar. 16, 2023

(86) PCT No.: PCT/FR2023/050372
§ 371 (c)(1),
(2) Date: Sep. 16, 2024

(87) PCT Pub. No.: WO2023/175280
PCT Pub. Date: Sep. 21, 2023

(65) Prior Publication Data

US 2025/0201119 A1 Jun. 19, 2025

(30) Foreign Application Priority Data

Mar. 16, 2022 (FR) ...................................... 2202312

(51) Int. Cl.
*G08G 1/09* (2006.01)
*B60Q 1/54* (2006.01)
(Continued)

(52) U.S. Cl.
CPC ......... *G08G 1/096708* (2013.01); *G08G 1/16* (2013.01); *B60Q 1/545* (2022.05); (Continued)

(58) Field of Classification Search
None
See application file for complete search history.

(56) References Cited

U.S. PATENT DOCUMENTS 9,507,346 B1 * 11/2016 Levinson ............ G06F 3/04847
11,015,942 B1 5/2021 Konrardy et al.
(Continued)

FOREIGN PATENT DOCUMENTS

CN 111766866 A 10/2020
JP 2006186939 A 7/2006
JP 2013074616 A 4/2013

OTHER PUBLICATIONS

International Search Report issued May 30, 2023, in corresponding International Application No. PCT/FR2023/050372, 8 pages.

*Primary Examiner* — Abdhesh K Jha
(74) *Attorney, Agent, or Firm* — Maier & Maier, PLLC

(57) ABSTRACT

A method for remotely supervising a fleet of self-driving vehicles (10, 20, 30, 40) where each vehicle includes sensors, a storage unit, and an automated driving unit able to detect an obstacle and to stop the vehicle if an obstacle is detected. Subsequent to the vehicle being stopped, establishing a wireless communication session between the vehicle and a remote supervision system. During the communication session, transmitting, from the vehicle to the supervision system: information currently being acquired by the sensors; and information previously acquired by the sensors and stored in the vehicle's storage unit. Transmitting, from the supervision system to the vehicle, a restart command or a restart prevention command; then closing down the communication session.

17 Claims, 2 Drawing Sheets

(51) Int. Cl.

| | |
|---|---|
| ***B60W 60/00*** | (2020.01) |
| ***G06V 20/58*** | (2022.01) |
| ***G08G 1/0967*** | (2006.01) |
| ***G08G 1/16*** | (2006.01) |
| *B60Q 1/50* | (2006.01) |
| *B60Q 5/00* | (2006.01) |
| *H04N 7/18* | (2006.01) |

(52) U.S. Cl.

CPC ........... *B60Q 5/006* (2013.01); *B60W 60/001* (2020.02); *G06V 20/58* (2022.01); *H04N 7/183* (2013.01)

(56) References Cited

U.S. PATENT DOCUMENTS

| | | | | |
|---|---|---|---|---|
| 2019/0384312 | A1* | 12/2019 | Herbach .............. | G05D 1/0055 |
| 2021/0064029 | A1 | 3/2021 | Tarakhovsky | |
| 2021/0096581 | A1 | 4/2021 | Simpson et al. | |
| 2021/0149389 | A1* | 5/2021 | Weslosky ............. | G05D 1/0038 |
| 2021/0191403 | A1 | 6/2021 | Rastoll et al. | |
| 2022/0073062 | A1 | 3/2022 | Gariepy et al. | |

* cited by examiner

METHOD AND SYSTEM FOR THE REMOTE SUPERVISION OF A FLEET OF SELF-DRIVING VEHICLES

TECHNICAL FIELD

The field of the invention is that of self-driving vehicles intended for the transport of goods and/or people, also called autonomous vehicles. The invention relates more particularly to ensuring safety in the functioning of a fleet of self-driving vehicles during their operation, by means of supervision of the vehicles as well as remote assistance.

PRIOR ART

A self-driving vehicle is equipped with a battery of sensors comprising in particular exteroceptive sensors (cameras, Lidars for example), each capable of providing information about the environment in which the vehicle is located. Such a vehicle also comprises an automated driving unit configured to develop, on the basis of the information obtained by the battery of sensors, a spatio-temporal path for the vehicle consistent with the operational missions entrusted to it.

Unlike an automated metro for example, a self-driving vehicle maneuvers in an open environment. The environment in which the vehicle maneuvers may thus change very quickly and place the vehicle in a momentarily disruptive situation. A change in the environment may force the vehicle out of its operational design domain. This must be detected in order to be able to place the vehicle in a stable, safe stopped state. The automated driving unit of the vehicle is thus able in particular to detect a nearby obstacle and to stop the vehicle in the event that a nearby obstacle is detected.

Self-driving vehicles currently in operation request takeover or assistance from a human driver who is present on board for safety, in order to respond to a departure from their operational design domain. It is thus the human driver who, following a safety stop, makes the decision on whether or not to restart the vehicle in automated driving mode.

Future self-driving vehicles, in particular vehicles of level 4 according to the SAE (Society of Automotive Engineers) standard, will be operated without a human driver on board. For these, there is a need for a solution to ensure a resumption of automated driving subsequent to a safety stop automatically initiated by a vehicle as a result of a detection by the vehicle of a departure from its operational design domain.

DESCRIPTION OF THE INVENTION

The invention aims to meet this need and therefore proposes a method for the remote supervision of a fleet of self-driving vehicles where each vehicle in the fleet comprises exteroceptive sensors each able to provide information about the environment of the vehicle, a storage unit able to store the information obtained by the exteroceptive sensors, and an automated driving unit able to detect a nearby obstacle on the basis of the information obtained by the exteroceptive sensors and to stop the vehicle in the event a nearby obstacle is detected.

The method comprises the following steps:

- subsequent to the vehicle being stopped by its automated driving unit, establishing a wireless communication session between the vehicle and a supervision system remote from the vehicle;
- during the wireless communication session:
  - transmitting, from the vehicle to the supervision system:
    - information currently being acquired by the exteroceptive sensors of the vehicle, constituting information about the real-time environment of the vehicle; and
    - information stored in the vehicle's storage unit, corresponding to information previously acquired by the exteroceptive sensors of the vehicle and constituting information about the past environment of the vehicle;
  - transmitting, from the supervision system to the vehicle, a restart command or a restart prohibition command; then
- closing down the wireless communication session.

Some preferred but non-limiting aspects of this method are as follows:

- it further comprises selecting a time window for which the information about the past environment of the vehicle is transmitted to the supervision system;
- the time window includes the time when the vehicle was stopped;
- establishing the wireless communication session comprises transmitting, by the vehicle to the supervision system, a signal indicating a vehicle motion stop;
- the signal indicating the vehicle motion stop is transmitted when the duration the vehicle is stopped exceeds a threshold;
- the signal indicating the vehicle motion stop carries information relating to a cause of the vehicle being stopped;
- the signal indicating the vehicle motion stop carries information relating to a category of the nearby obstacle;
- the exteroceptive sensors comprise a camera, the transmitting of information about the real-time environment of the vehicle comprises transmitting a video stream currently being captured by the camera, and the transmitting of information about the past environment of the vehicle comprises transmitting a video excerpt previously captured by the camera and stored in the vehicle's storage unit;
- it further comprises displaying, on a display device of the supervision system, information about the real-time environment of the vehicle and information about the past environment of the vehicle, the information about the real-time environment of the vehicle being displayed on the right of the display device and the information about the past environment of the vehicle being displayed on the left of the display device;
- it further comprises transmitting, by the supervision system to the vehicle, a command to honk its horn or a command to flash its headlights;
- it further comprises transmitting, by the supervision system to a local operator, an intervention request.

BRIEF DESCRIPTION OF DRAWINGS

Other aspects, aims, features and advantages of the invention will become more apparent upon reading the following detailed description of some preferred embodiments thereof, given by way of non-limiting example and made with reference to the appended drawings, in which.

DETAILED DESCRIPTION OF SPECIFIC EMBODIMENTS

Figure 1:
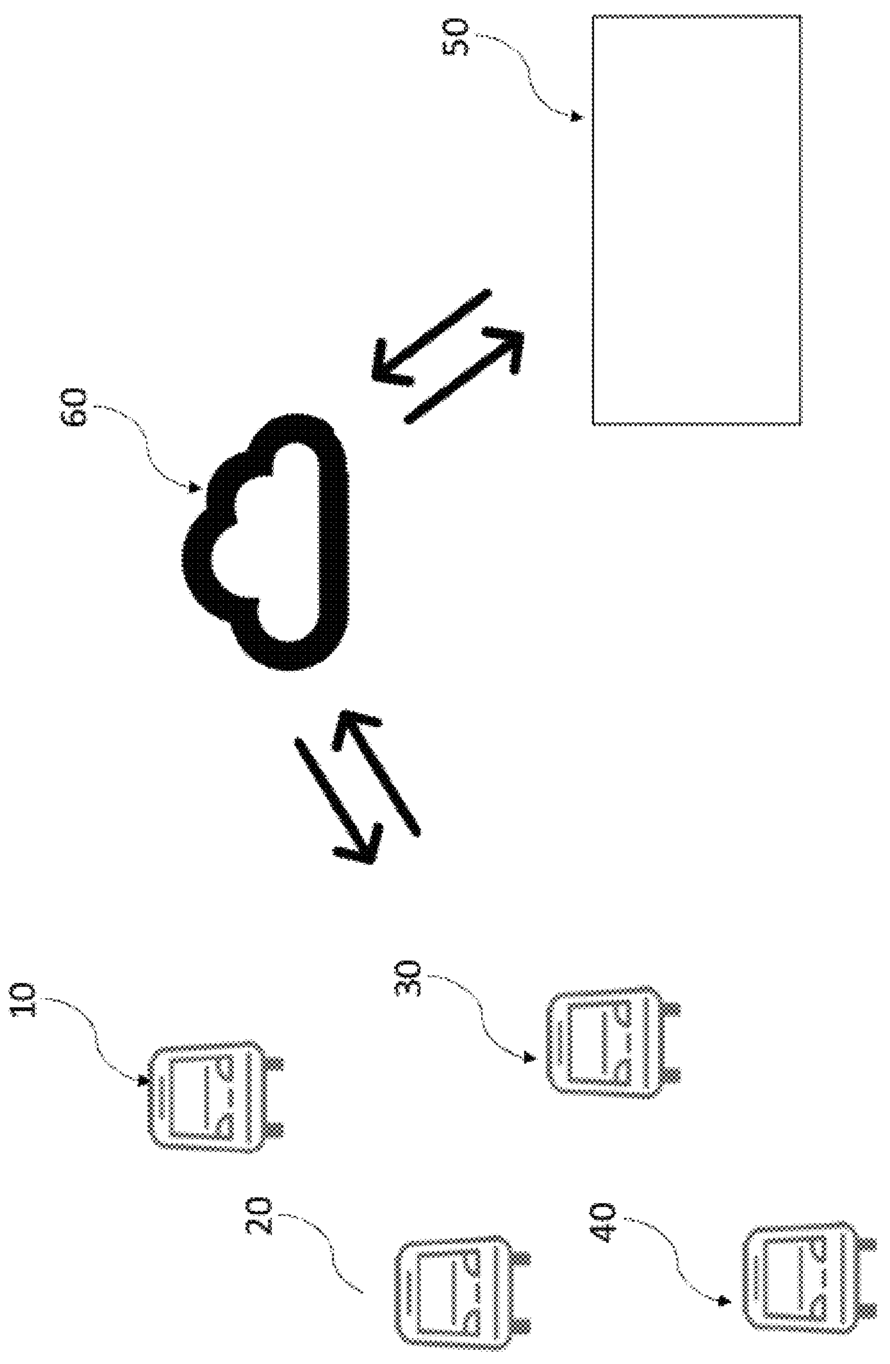
FIG. 1 is a diagram illustrating a fleet of self-driving vehicles and a remote supervision system for the fleet.

With reference to FIG. 1, the invention relates to a method for the remote supervision of a fleet of self-driving vehicles 10, 20, 30, 40. The vehicles in the fleet may be operated at a same site or conversely may be deployed at different sites.

Each vehicle in the fleet comprises exteroceptive sensors, each capable of providing information about the environment of the vehicle. Each vehicle in the fleet may also comprise proprioceptive sensors, each capable of providing information about the status of the vehicle.

Each vehicle in the fleet also carries onboard a storage unit capable of storing the information obtained by the various sensors. The storage unit may thus store:

- raw obstacle detection measurements,
- position information resulting from the fusion of different data streams coming for example from Lidars, an inertial measurement unit, and a satellite-based positioning system,
- video streams captured by cameras, for example four exterior cameras (a camera capturing the front of the vehicle, a camera capturing the rear of the vehicle, a camera capturing the right of the vehicle, and a camera capturing the left of the vehicle) and an interior camera capturing the interior of the vehicle.

The storage unit may further store:

- vehicle commands, such as commands for propulsion, braking, steering, emergency braking, lighting, or door position,
- vehicle status information, such as its speed or engine temperature;
- events, such as an emergency stop of the vehicle or a sensor failure.

Each vehicle in the fleet also has an automated driving unit able to detect a nearby obstacle on the basis of information obtained by the exteroceptive sensors, and to stop the vehicle in the event a nearby obstacle is detected.

In order to ensure the resumption of service in automated driving mode while ensuring safety, the method according to the invention comprises, subsequent to a vehicle of the fleet being stopped by its automated driving unit, establishing a wireless communication session between the stopped vehicle and a supervision system 50 distant from the vehicle. This communication session may in particular be carried out via a cloud service 60. This communication session is therefore not established continuously between the vehicle and the remote supervision system, but as a result of the vehicle being stopped, which allows limiting the volume of data exchanged between the vehicle and the supervision system.

During the wireless communication session, the vehicle sends to the remote supervision system both the information currently being acquired by the vehicle's exteroceptive sensors (constituting information about the real-time environment of the vehicle) and the information stored in the vehicle's storage unit, corresponding to information previously acquired by the vehicle's exteroceptive sensors (constituting information about the past environment of the vehicle).

The remote supervision system then sends the vehicle a restart command or a restart prohibition command. The wireless communication session is then interrupted.

As indicated above, the exteroceptive sensors comprise cameras, and in one possible embodiment, transmitting information about the real-time environment of the vehicle comprises transmitting a video stream currently being captured by one or more of the cameras, and transmitting information about the past environment of the vehicle comprises transmitting a video excerpt previously captured by the camera or cameras and stored in the vehicle's storage unit.

In another embodiment, which may be implemented independently of or in addition to the previous one, transmitting information about the real-time environment of the vehicle and about the past environment of the vehicle comprises transmitting data from one or more exteroceptive sensors other than cameras, for example information from Lidar or radar.

The supervision system typically comprises a display device on which information about the real-time environment of the vehicle and information about the past environment of the vehicle are displayed. This typically involves displaying one or more real-time video streams as well as one or more past video excerpt. When information from other types of sensors is sent up, it is formatted in order to provide a human-friendly representation of the perception by the vehicle.

An operator of the supervision system is thus able to view information about the past environment of the vehicle, which allows the operator to contextualize what happened before the stop and thus to understand the reasons for the stop. This operator is also able to view the real-time environment of the vehicle, which allows him or her to check for the presence or absence of obstacles. Observing information about the past environment also allows the operator to resolve ambiguities such as, for example, the non-appearance of a pedestrian in the real-time information while analysis of the past information provides the understanding that the pedestrian is under the vehicle chassis. Based on his or her analysis of the displayed information, the operator authorizes or prevents restarting the vehicle in automated driving mode.

For example, in this manner the operator can verify that the obstacle detected by the vehicle is a false positive (a cloud of gnats, grass blown out by a mower operating along the edge of a road, a cloud of dust, or bags and boxes on the traffic lane) and that it is thus possible to ignore it. The operator may also verify that an interfering obstacle has been removed from the traffic lane or may even decide that a detected obstacle is not inconvenient/annoying as it is possible to bypass it (for example a vehicle parked on the shoulder). The operator may also ensure that a moving obstacle (a person, an animal) no longer presents a hazard.

Figure 2:
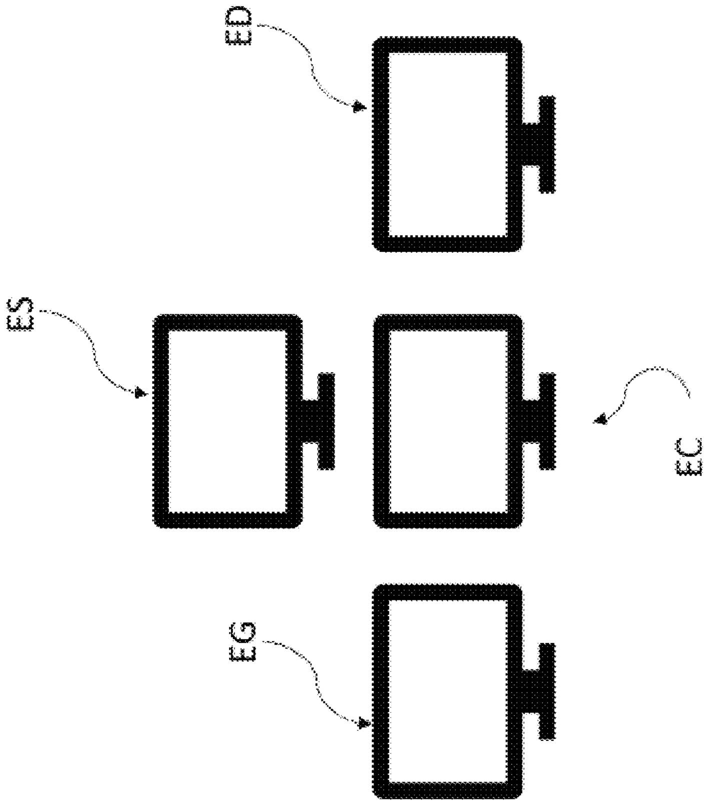
FIG. 2 is a diagram illustrating one possible distribution of information of different types on a display device of the supervision system.

As shown in FIG. 2, the display device may be subdivided into several display members or sections, for example by means of several screens. In one possible embodiment, four screens are used: three screens arranged horizontally (a left screen EG, a central screen EC, and a right screen ED) and an upper screen ES placed above the central screen EC.

Information about the real-time environment of the vehicle may be displayed on the right of the display device (for example on right screen ED) and information about the past environment of the vehicle may be displayed on the left of the display device (for example on left screen ED). This mode of presentation, with the past on the left and real time on the right, helps the operator to carry out the task of deciding whether or not to authorize restarting the vehicle in automated driving mode.

In one possible embodiment using four exterior cameras and one interior camera, each of the left and right screens is subdivided into five zones: a central zone containing the information captured by the interior camera, an upper zone containing the information captured by the exterior camera capturing the front of the vehicle, a lower zone containing the information captured by the exterior camera capturing the rear of the vehicle, a left side zone containing the information captured by the exterior camera capturing the left of the vehicle, and a right side zone containing the information captured by the exterior camera capturing the right of the vehicle.

Central screen EC may be used to display and/or specify control and planning information for the fleet of vehicles under supervision. Orders, instructions, or requests for intervention may be transmitted using it.

Upper screen ES placed above the central screen may be used to display a map of a deployment site for the fleet vehicles, for example with a representation of the route followed by each of the vehicles.

The display device thus allows the operator to visualize the current situation (access to videos of the vehicle, to a human-friendly representation of the perception by the vehicle), review the scene before stopping the vehicle (in the form of videos, perception representation), give commands to the vehicle (command to restart in automated driving mode, restart prohibition command, command to honk its horn, to flash its headlights), to give instructions (such as limiting the speed on the route), or configuring the operation of the vehicle (periods of time until sending a stop alert which are configurable according to the location or service, definition of zones where any stop must generate a high security alert, definition of specific hazardous zones).

In one possible embodiment, the supervision method comprises selecting, for example by the aforementioned operator, a time window for which the information about the past environment of the vehicle is sent to the supervision system. This time window preferably includes the time the vehicle was stopped, the "stop time". This time window typically covers a period before the stop time (for example lasting 10 seconds) and a period after the stop time (for example lasting 20 seconds).

In one possible embodiment, establishing the wireless communication session comprises transmitting, by the vehicle to the supervision system, a signal indicating the vehicle motion stop. This signal indicating the vehicle motion stop may in particular be transmitted when the duration the vehicle is stopped exceeds a threshold. This threshold is preferably configurable, for example depending on the areas of the site (the case of an area near a stop sign for example where the threshold will typically be higher).

The signal indicating the vehicle motion stop preferably carries information relating to a cause of the vehicle being stopped (for example the presence of a fixed obstacle completely obstructing the lane or the presence of a moving obstacle), this cause being determined by the vehicle's automated driving unit. The signal indicating the vehicle motion stop also preferably carries information relating to a category of the nearby obstacle (for example resulting from an object categorization algorithm and of a type such as the obstacle is a person with a probability of 90%), this category being determined by the vehicle's automated driving unit.

A first use case of the supervision system concerns a poorly parked car double-parked on the route of an autonomous vehicle. The vehicle automatically stops before this car and informs the supervision system. The operator of the supervision system watches real-time videos and past video excerpts. The operator of the supervision system may command the vehicle to honk its horn or flash its headlights and may verify, using the real-time videos, that the car initially parked incorrectly is no longer interfering with the operation of the vehicle.

Another use case concerns an object falling from a car. The vehicle automatically stops before this object and informs the supervision system. The operator of the supervision system watches real-time videos and past video excerpts. The operator of the supervision system may request the intervention of a local operator to remove the object from the traffic lane. The operator of the supervision system may verify the actual removal of the object in the real-time videos, and may initiate a restart of the vehicle in automated mode.

Yet another use case concerns a pedestrian or an animal that is crossing near the vehicle. The vehicle automatically stops before this moving object and informs the supervision system. The operator of the supervision system watches real-time videos and past video excerpts. He or she may order the vehicle to honk its horn. Once the traffic lane is empty and after consulting past video excerpts, if necessary, to understand where the pedestrian or animal has gone, the operator may authorize a restart of the vehicle in automated mode.

Another use case is the loss of a sensor, for example due to deliberate damage. The vehicle stops automatically following this loss and informs the supervision system. The operator of the supervision system views real-time videos and past video clips. He or she may request the intervention of a local operator.

In one possible embodiment, each vehicle is further equipped with a detection unit of accident-prone situations configured to detect warning signs of incidents, on the basis of the information provided by the sensors. This unit is, for example, able to identify a repetition of unanticipated behaviors in the vehicle's deployment conditions, such as repeated sudden braking of the vehicle in a same area. These sudden brakings are for example the consequence of the installation of a new pedestrian crossing on the vehicle's path, the recurring presence of vehicles regularly parked just before a pedestrian crossing resulting in occlusion and abrupt braking, or the recurring presence of vehicles poorly parked along the path of the vehicle causing slowdowns. Warning signs thus detected may be transmitted to the supervision unit which, for example by means of analyzing the videos captured by the vehicle's cameras, is able to understand their origins. An action to reduce these occurrences of the hazard may then be launched, for example raising awareness among certain recurring delivery drivers, positioning posts to reduce occlusion of the pedestrian crossing, requesting the installation of speed bumps, requesting correction of the drawn white lines to influence the paths taken, or updating the vehicle's deployment conditions with, for example, the inclusion of a new pedestrian crossing in the route.

The invention is not limited to the method as described above but also extends to the remote supervision system described above and in particular to a system comprising a processor configured to, during a wireless communication session established with one of the vehicles of the fleet subsequent to the vehicle being stopped by its automated driving unit:

- control the reception from the vehicle of information about the real-time environment of the vehicle and information about the past environment of the vehicle;

transmit to the vehicle a restart command or a restart prohibition command.

Such a supervision system is advantageously equipped with the display device described above.

Thus one possibility would be the implementation of a method for the remote supervision of a fleet of self-driving vehicles 10, 20, 30, 40, the vehicles in the fleet being able to be operated on a same site or be deployed on different sites, where each vehicle in the fleet comprises exteroceptive sensors. In addition, each vehicle may comprise proprioceptive sensors, each capable of providing information about the environment and/or the status of the vehicle; a storage unit able to store the information obtained by the sensors, by data fusion, vehicle commands, the vehicle status, and events; and an automated driving unit able to detect a nearby obstacle on the basis of information obtained by the exteroceptive sensors and to stop the vehicle in the event a nearby obstacle is detected. The method comprises the following steps:

- subsequent to a vehicle being stopped by its automated driving unit, establishing a wireless communication session between the vehicle and a supervision system 50 remote from the vehicle;
- during the wireless communication session:
  - transmitting, from the vehicle to the supervision system:
    - information currently being acquired about the real-time environment of the vehicle; and
    - information stored in the vehicle's storage unit corresponding to information previously acquired and constituting information about the past environment of the vehicle;
  - transmitting, from the supervision system to the vehicle, a restart command or a restart prohibition command; then
- closing down the wireless communication session.

A supervision system for a fleet of self-driving vehicles may also be proposed. The vehicles in the fleet may be operated on a same site or may be deployed on different sites, where each vehicle in the fleet comprises exteroceptive sensors and possibly proprioceptive sensors, each able to provide information about the environment and/or the vehicle status; a storage unit able to store the information obtained by the sensors, by data fusion, vehicle commands, the vehicle status, and events; and an automated driving unit able to detect a nearby obstacle on the basis of the information obtained by the exteroceptive sensors and to stop the vehicle in the event a nearby obstacle is detected. The system further comprises a processor configured to, during a wireless communication session established with one of the vehicles in the fleet subsequent to the vehicle being stopped by its automated driving unit:

- control the reception from the vehicle of information currently being acquired by the vehicle's sensors constituting information about the real-time environment of the vehicle, and information stored in the vehicle's storage unit corresponding to information previously acquired by the vehicle's sensors and constituting information about the past environment of the vehicle;
- transmit to the vehicle a restart command or a restart prohibition command.

This possible method and this possible system may advantageously be supplemented by the following features, taken alone or in any technically feasible combination.

One use case for the supervision system concerns the loss of a sensor, causing the vehicle to stop automatically subsequent to said loss and to so inform the supervision system.

Each vehicle is further equipped with a detection unit of accident-prone situations configured to detect warning signs of incidents. These warning signs are transmitted to the supervision unit which is able to understand their origins.

The unit is able to identify a repetition of unanticipated behaviors in the vehicle's deployment conditions.

The unit is able to identify repeated sudden braking of the vehicle in a same area.

An action to reduce the occurrences of the hazard may be launched.

The action to reduce the occurrences of the hazard consists of one or more of the following actions:

- raising awareness among certain recurring delivery drivers;
- positioning posts to reduce occlusion of the pedestrian crossing;
- requesting the installation of speed bumps;
- requesting correction of the drawn white lines;
- updating the vehicle's deployment conditions.

The storage unit stores video streams capturing the vehicle interior.

When information from types of sensors other than those providing video streams are sent up, this is formatted in order to provide a human-friendly representation of the perception by the vehicle.

The display device is subdivided into several display members or sections, for example by means of several screens.

The display device of the supervision system is used to display and/or specify management and planning information for the fleet of vehicles under supervision, display a map of a deployment site for the fleet vehicles, a representation of the route followed by each vehicle.

The method may further comprise transmitting, by the supervision system to the vehicle, instructions or the operating configuration of the vehicle.

The invention claimed is:

1. A method for the remote supervision of a fleet of self-driving vehicles where each vehicle in the fleet, operated at a same site or deployed at different sites, comprises exteroceptive sensors each configured to provide information about the environment of the vehicle, a storage unit configured to store the information obtained by the exteroceptive sensors, and an automated driving unit configured to detect a nearby obstacle on the basis of the information obtained by the exteroceptive sensors and to stop the vehicle in the event a nearby obstacle is detected, the method comprising the following steps:

- subsequent to the vehicle being stopped by its automated driving unit, establishing a wireless communication session between the vehicle and a supervision system remote from the vehicle;
- during the wireless communication session:
  - transmitting, from the vehicle to the supervision system:
    - information currently being acquired by the vehicle's exteroceptive sensors, constituting information about the real-time environment of the vehicle; and
    - information stored in the storage unit of the vehicle, corresponding to information previously acquired by the exteroceptive sensors of the vehicle and constituting information about the past environment of the vehicle;
  - transmitting, from the supervision system to the vehicle, a restart command or a restart prohibition command; and transmitting, from the supervision system to the vehicle, one or more adjustments to change a configuration of operation of the vehicle; then subsequent to transmitting information from the supervision system to the vehicle, closing down the wireless communication session;

based on information provided from the vehicle to the supervision system, transmitting, by the supervision system to a local operator, an intervention request.

2. The method according to claim 1, further comprising the selection of a time frame for which information about the past environment of the vehicle is transmitted to the supervision system.

3. The method according to claim 2, wherein the time frame includes the time when the vehicle was stopped.

4. The method according to claim 1, wherein establishing the wireless communication session comprises transmitting, by the vehicle to the supervision system, a signal indicating a vehicle motion stop.

5. The method according to claim 4, wherein the signal indicating the vehicle motion stop is transmitted when the duration the vehicle is stopped exceeds a threshold.

6. The method according to claim 4, wherein the signal indicating the vehicle motion stop carries information relating to a cause of the vehicle being stopped.

7. The method according to claim 4, wherein the signal indicating the vehicle motion stop carries information relating to a category of the nearby obstacle.

8. The method according to claim 1, wherein the exteroceptive sensors comprise a camera, the transmitting of information about the real-time environment of the vehicle comprises transmitting a video stream currently being captured by the camera, and the transmitting of information about the past environment of the vehicle comprises transmitting a video excerpt previously captured by the camera and stored in the vehicle's storage unit.

9. The method according to claim 1, further comprising displaying, on a display device of the supervision system, information about the real-time environment of the vehicle and information about the past environment of the vehicle, the information about the real-time environment of the vehicle being displayed on the right of the display device and the information about the past environment of the vehicle being displayed on the left of the display device.

10. The method according to claim 1, further comprising transmitting, by the supervision system to the vehicle, a command to honk its horn or a command to flash its headlights.

11. A supervision system for a fleet of self-driving vehicles where each vehicle in the fleet, operated at a same site or deployed at different sites, comprises: exteroceptive sensors each configured to provide information about the environment of the vehicle, a storage unit configured to store the information obtained via the exteroceptive sensors, and an automated driving unit configured to detect a nearby obstacle on the basis of the information obtained by the exteroceptive sensors and indicating the stop of the vehicle in the event a nearby obstacle is detected, the system comprising a processor configured to, during a wireless communication session established with one of the vehicles of the fleet subsequent to the vehicle being stopped by its automated driving unit:

control the reception from the vehicle of information currently being acquired by the exteroceptive sensors of the vehicle constituting information about the real-time environment of the vehicle and of information stored in the storage unit of the vehicle corresponding to information previously acquired by the exteroceptive sensors of the vehicle and constituting information about the past environment of the vehicle;

transmit to the vehicle a restart command or a restart prohibition command;

transmit to the vehicle one or more adjustments to change a configuration of operation of the vehicle; and based on information provided from the vehicle to the supervision system, transmit, to a local operator, an intervention request.

12. The method according to claim 1, wherein each vehicle is further equipped with a detection unit of accident-prone situations, said detection unit being configured to detect warning signs of incidents, these warning signs being transmitted to the supervision system.

13. The method according to claim 12, wherein said detection unit is configured to identify a repetition of unanticipated behaviors in the vehicle's deployment conditions.

14. The method according to claim 13, wherein said detection unit being is to identify repeated sudden braking of the vehicle in a same area.

15. The method according to claim 1, wherein the storage unit stores video streams capturing the interior of the vehicle.

16. The method according to claim 5, wherein said threshold is configured.

17. The method according to claim 16, wherein said threshold is configured depending on areas of a site at which the vehicle operates.

* * * * *